May 20, 1958 J. A. DOREMUS 2,835,794

DIVERSITY RECEIVING SYSTEM

Filed March 22, 1952 3 Sheets-Sheet 1

INVENTOR.
John A. Doremus
BY
Foorman L. Mueller
Atty.

INVENTOR.
John A. Doremus
BY
Foorman L. Mueller
Atty.

May 20, 1958 J. A. DOREMUS 2,835,794

DIVERSITY RECEIVING SYSTEM

Filed March 22, 1952 3 Sheets-Sheet 3

INVENTOR.
John A. Doremus
BY
Foorman L. Mueller
Atty.

United States Patent Office 2,835,794

Patented May 20, 1958

2,835,794

DIVERSITY RECEIVING SYSTEM

John A. Doremus, Chicago, Ill., assignor to Motorola, Inc., Chicago, Ill., a corporation of Illinois Application March 22, 1952, Serial No. 278,068

13 Claims. (Cl. 250—20)

This invention relates generally to signal receiving systems and more particularly to a system including a central station and remote receivers in which the signal from the receiver providing the best signal is reproduced at the central station.

In order to provide good radio reception at all times, signal receiving systems have been provided wherein a plurality of radio receivers are physically separated from each other so that there is a good chance that at least one of the receivers will receive a strong signal at all times. This has been found to be effective against fading which results from varying atmospheric conditions. The signals are then selected so that the best signal of one or more signals may be reproduced. Such systems have been generally called "diversity" receiving systems and have been of various types.

There is also a problem of deriving the best signal from a plurality of receivers which are positioned along a course for receiving signals from a moving object travelling along the course. As an example, it may be desired to receive signals from a train which is moving along a track by receivers positioned along the track. Another example is the requirement for communication between a microwave relay system and vehicles moving along the system through V. H. F. radio equipment on the vehicles and at the stations of the system. In such cases it is desired to automatically use the signal from the receiver which receives the best signal so that continuous communication is provided even though a particular receiver may at times not provide a good signal.

It is therefore an object of the present invention to provide an improved diversity receiving system.

It is another object of this invention to provide a receiving system in which signals from remote receivers are applied to a central station together with control signals which indicate the quality thereof and in which a signal having a predetermined quality is reproduced at the central station.

A further object of this invention is to provide a system wherein a received signal and a control signal indicating a characteristic of the received signal are transmitted together over a single communication channel.

A still further object of this invention is to provide a plurality of receivers spaced along a course which are connected in groups to a smaller number of communication channels connecting the receivers to a central station, with a control system at the central station for reproducing the signal from the channel which provides the best signal.

A feature of this invention is the provision of a receiving system including a remote receiver for receiving and demodulating a carrier wave and having means associated therewith for producing a control signal varying in frequency with a characteristic of the received carrier wave, and with the control signal being outside the frequency band of the modulating signal so that the modulating signal and control signal can be transmitted over a single channel.

A further feature of this invention is the provision of a receiving system in which received signals and control signals indicating characteristics of the received signals are provided, which system includes means responsive to the control signals for automatically reproducing one of the received signals having characteristics which have a predetermined relation with respect to the characteristics of the other received signals.

A further feature of this invention is the provision of a selecting system for control signals which vary in frequency with a characteristic of received signals and in which a plurality of such control signals may be received on a single channel, which system attenuates signals having frequencies representing particular characteristics with respect to signals having frequencies representing characteristics different from said particular characteristics, then limits the combined signals to effectively eliminate all signals except the signal of the highest amplitude which represents the different characteristic, and thereafter produces a voltage corresponding to the frequency of the remaining signal.

Still another feature of this invention is the provision of a system for selecting control voltages of variable amplitude which comprises controlling the current through a common impedance element in accordance with the control voltages to produce a voltage which in effect represents the total of the various control voltages, deriving bias voltages which vary with the total voltage and establishing conductive circuits when the control voltages have a predetermined relation with respect to the bias voltages.

Further objects and features, and the attending advantages of the invention will be understood from a consideration of the following description when taken in connection with the accompanying drawings in which.

In practicing the invention there is provided a receiving system which includes a plurality of physically separated receiving stations and a central station which is connected to the receiving stations. At each receiving station there is provided a radio receiver for receiving modulated carrier waves and further means for providing a control signal having a frequency outside the frequency of the modulating signal which varies in frequency with a characteristic of the received wave. As the control signal is outside the frequency of the modulating signal, it can be transmitted over a single communication channel with the modulating signal. The control signal may represent the strength of the received signal or the reduction of noise achieved in the receiver or combinations of both of these characteristics. The received signals and control signals from a plurality of stations are applied to the central station wherein the control signals and modulating signals are separated by frequency selecting means. The control signals are then translated to voltages which vary with the frequency of the control signals so that the voltages represent the characteristics of the received carrier waves. These voltages are applied to a selecting circuit which operates to connect the modulating signal from one of the receivers to reproducing means. The selecting circuit operates to reproduce the signal from the receiver which produces a control voltage which exceeds a predetermined relation to the control voltage from all the receivers with this signal being reproduced until it falls below said predetermined relation when the signal from one of the other receivers will be connected to the reproducing means.

It may be desired to use the system in accordance with the invention for communicating between the stations in a microwave relay system and a vehicle traveling adjacent the system. In such case a plurality of receivers may be connected to a single communication channel, and a plurality of modulating signals and the associated control signals may be simultaneously applied to the channel. The selecting or comparing means at the central station has such characteristics that the amplitude of the control signal representing a more desired received wave will be attenuated with respect to the control signal representing a less desirable received wave. These signals are then limited to effectively eliminate the lower amplitude signal representing the most desired received wave. The control voltage produced from the control signal will then represent the least desired control signal from any given channel. This eliminates the selection of a channel having a good signal and also a poor signal which would prevent satisfactory reproduction of the good signal.

Figures 1, 2:
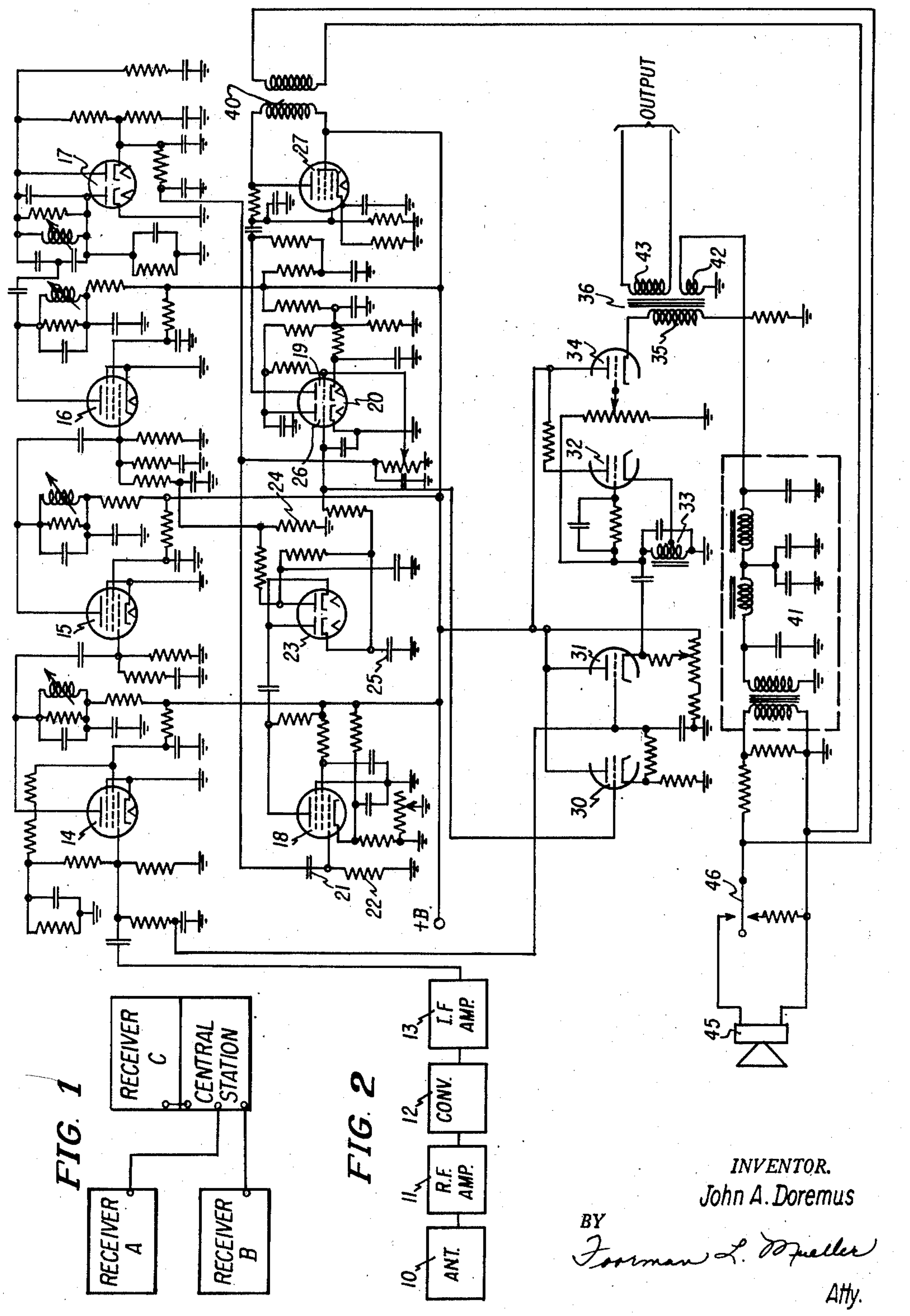
Fig. 1 is a block diagram illustrating the systems in accordance with the invention.
Fig. 2 illustrates the receiver and control equipment at the remote stations.

Referring now to the drawings, in Fig. 1 there is illustrated in block diagram form a system including receivers A, B and C which are physically separated from each other. These receivers are positioned so that the signal strength of at least one of the receiving stations will be strong at all times. Various factors to be considered in locating the receiving stations are known and will not be discussed herein. These receivers are interconnected with a central station which may be at the same location with one of the receivers.

In Fig. 2 there is illustrated the equipment provided at each receiving station. This equipment includes a frequency modulation communication receiver and means for producing a control signal varying in frequency with a characteristic of the carrier wave received by the receiver. Means are also provided for combining the modulating signal and the control signal for transmission over a single channel. More specifically, the radio receiver includes an antenna circuit 10, radio frequency amplifier 11, converter 12 and intermediate frequency amplifier 13 which may be of any suitable standard construction. One or more stages of frequency conversion may be provided as may be desired in a particular application. An additional intermediate frequency amplifier stage including the vacuum tube 14 is provided which is coupled to the limiter stages including the tubes 15 and 16. The limited signal is applied to the discriminator stage including the double diode tube 17 which derives the modulating signal from the frequency modulated wave. The output of the discriminator is applied to an audio amplifier including the triode section 19 of the double triode tube 20.

The output of the discriminator is also applied to a filter including capacitor 21 and resistor 22 which selects noise above the frequency of the modulating signal. This noise signal is applied to the noise amplifier stage which includes the tube 18. The amplified noise is rectified by the stage including double diode tube 23 and is combined differentially with a voltage from the grid of the second limiter stage 16 which appears across resistor 24. A voltage is therefore provided across condenser 25 which varies with the signal strength and the noise produced in the receiver and this is applied to the triode section 26 of the tube 20 which functions as a squelch tube. The output of the triode section is applied as a bias to the grid of the triode section 19 of the audio amplifier. When the received signal as indicated by the voltage on the limiter grid is sufficiently high and the noise level is sufficiently low, the triode 19 will be conducting and will amplify the audio signal and apply the same to the output stage which includes the pentode tube 27.

As previously stated, a control voltage is provided indicating a characteristic of the wave received by the receiver and this may be derived from various places in the receiver circuit. The voltage applied to the squelch tube 26 may be used for this purpose since it is a measure of the signal strength and also of the noise limiting. It may also be desirable to use a measure of the received wave at an earlier stage of the receiver, at which point substantial limiting action has not taken place. Such a measure may be obtained from the grid of the intermediate frequency amplifier stage 14. In the circuit of Fig. 2, the squelch voltage is applied to the grid of triode section 30 which operates as a cathode follower. This squelch voltage is then combined with the voltage from the grid of the intermediate frequency amplifier tube 14, with the combined voltage being applied to the grid of the modulator tube 31. The modulator tube 31 controls the oscillator which includes the triode 32 and the tuned circuit 33 so that the output frequency of the oscillator varies through a range of frequencies depending upon the voltage applied to the modulator grid. In actual practice it has been found satisfactory to use a frequency range from 3600 to 4000 cycles per second for the oscillator, with the frequency varying directly with the voltage applied. The control signal is then amplified in the triode section 34 and applied to the primary 35 of transformer 36.

The output signal of the receiver is applied from the output transformer 40 thereof to a filter circuit 41 which limits the output signal frequency to 3000 cycles per second. This is necessary to prevent the output signals of the receiver from interfering with the control signals and still provides a sufficient band for the output signals. The audio output is then applied to the winding 42 of the transformer 36 and combined with the control signals so that the output winding 43 applies the combined signals to a single communication channel. A reproducing device 45 may be selectively connected to the output transformer 40 through switch 46 for monitoring purposes at the receiving station if this is desired.

Figure 3:
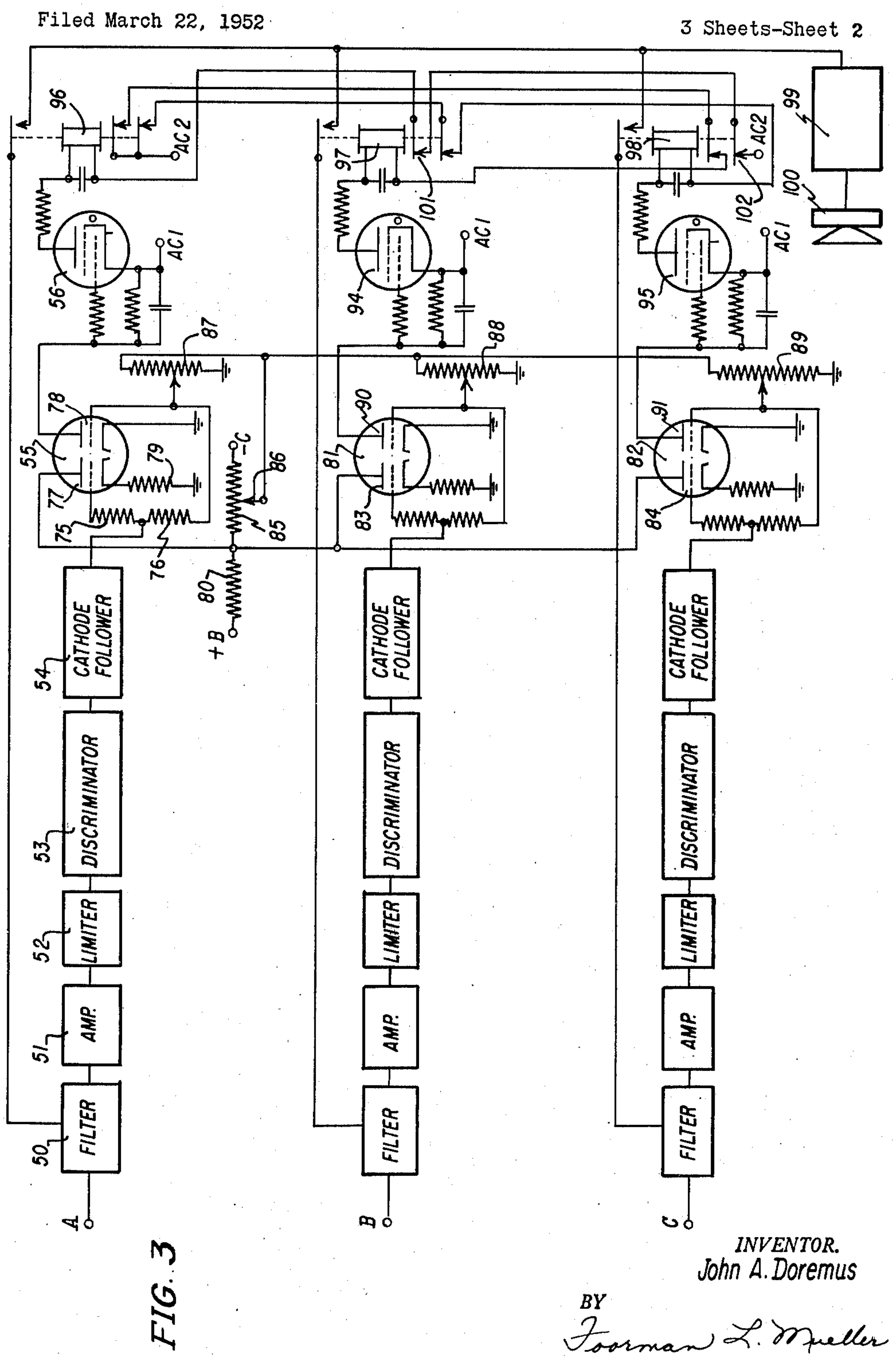
Fig. 3 represents the control and reproducing equipment at the central station.
Figure 4:
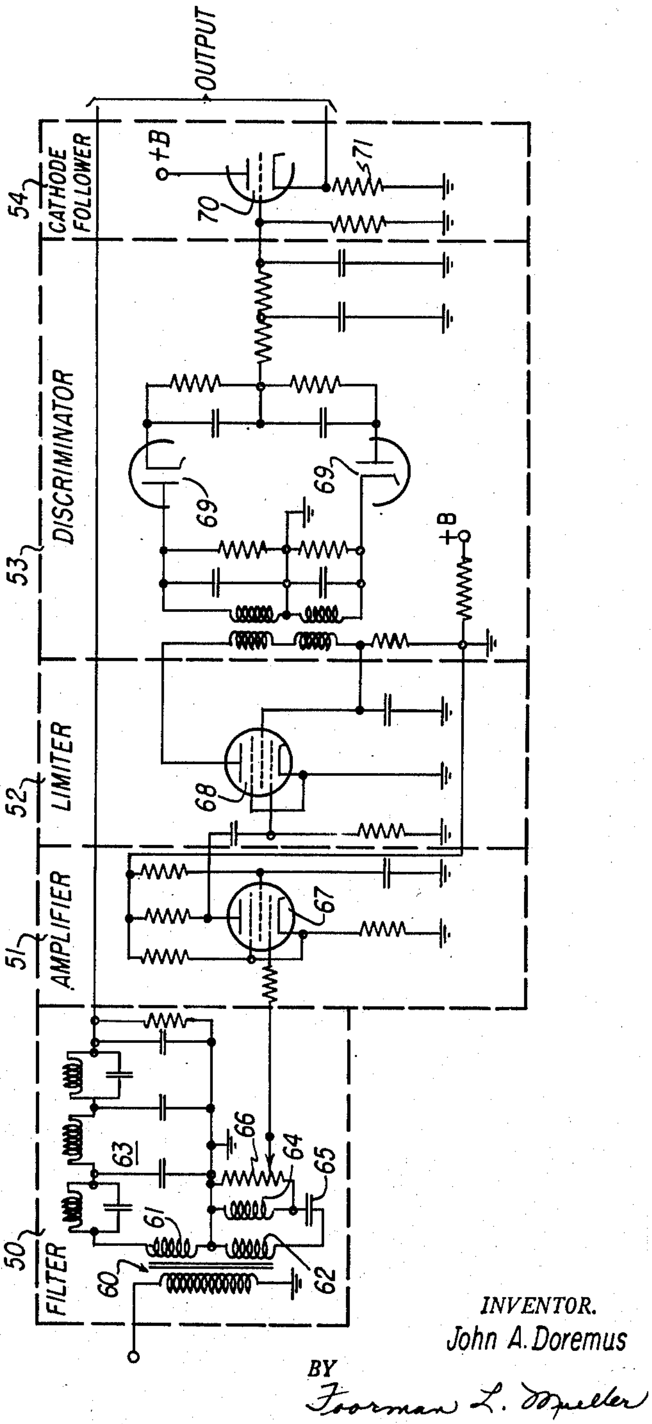
Fig. 4 illustrates more in detail the circuit of components of Fig. 3 shown in block diagram.

Considering now the equipment at the central station, the equipment required for a system in which three receivers A, B and C are used is illustrated in Figs. 3 and 4. As shown in Fig. 3, the signals from each receiving station are applied through separate channels each including a filter 50 for separating the modulating and control signals. The control signals are then applied through amplifier 51, limiter 52, discriminator 53, cathode follower coupling circuit 54, and the selecting circuit including the double triode 55 and the thyraton tube 56. The circuits of the filter, amplifier, limiter, discriminator, and cathode follower are shown in detail in Fig. 4.

Figure 5:
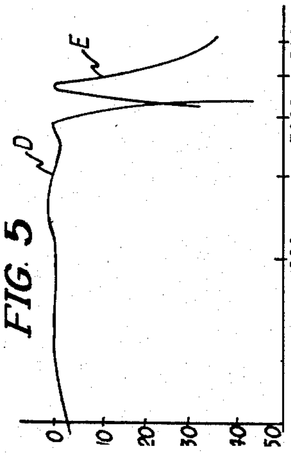
Fig. 5 is a chart illustrating the operation of the filters of Fig. 4.

The filter 50 includes an input transformer 60 having two secondary windings 61 and 62. The secondary winding 61 feeds a low pass filter generally indicated at 63 which derives the modulating signal from the combined signal applied to the central station. The response of the filter 63 is indicated by the curve D of Fig. 5. The secondary winding 62 is connected to a sharply tuned circuit including coil 64 and condenser 65 which selects the control signal. This circuit is arranged to provide a maximum response in the vicinity of 3600 cycles per second with a decreasing response at 4000 cycles per second and with a greatly attenuated response at 3000 cycles per second so that the output thereof does not include the voice signal. This response is indicated by the curve E of Fig. 5. The control signal is derived across potentiometer 66 and applied to pentode 67 of the amplifier 51. The output of the amplifier is applied to the pentode 68 of limiter 52 which functions to limit the amplitude of the control signal. The limited signal is then applied to discriminator 53 including the double diode 69 which produces a control voltage varying with the frequency of the control signal applied thereto. This control voltage is applied to the triode section 70 of the cathode follower 54 which provides an output across resistor 71 which is applied to the selecting circuit.

Referring now again to Fig. 3, and considering the control signal from channel A, it will be apparent that the signal from the cathode follower is applied through resistors 75 and 76 respectively to the grids of the triode sections 77 and 78 of the tube 55. The cathode of the triode section 77 is connected to ground through resistor 79 and the plate thereof is connected to B plus through resistor 80. It is here to be noted that the selecting circuit is connected to all of the three channels A, B and C and that the channels B and C provide control voltages which are applied to the tubes 81 and 82 respectively, which are identical to tube 55. These tubes include triode sections 83 and 84 respectively having plates connected through the resistor 80 to plus B. The voltage drop across resistor 80 will therefore be an indication of the combined control voltages from the channels A, B and C since each will cause current flow through resistor 80 and thereby increase the voltage drop thereacross. In order to provide a bias voltage which is of the required magnitude, a resistor 85 is connected from the low voltage end of resistor 80 to a negative potential designated −C. An intermediate potential along resistor 85 is derived from the tap 86 and applied in parallel to resistors 87, 88 and 89. Each of these resistors includes a movable tap connected to the grid of one of the second sections 78, 90 and 91 of the tubes 55, 81 and 82 respectively.

Considering now channel A, the voltage applied from the cathode follower 54 through resistor 76 is therefore combined with a portion of the voltage across resistor 87 with both voltages being applied to the grid of the triode section 78. The triode section 78 will therefore be rendered conducting only when the voltage from the cathode follower is sufficient to overcome the negative bias applied to the triode 78 through resistor 87. It is therefore apparent that by proper adjustment of the movable tap 86 of resistor 85 and movable tap on resistor 87, the tube 78 can be rendered conducting when the voltage from the cathode follower 54 has a predetermined relation to the voltages from all the cathode followers of the channels A, B and C. The output circuits of the triode sections 78, 90 and 91 are individually connected to control tubes which may be thyratron tubes 56, 94 and 95. When the triode 78, 90 and 91 are rendered conducting, potentials are applied to the thyratron tubes 56, 94 and 95 for rendering these tubes individually conducting. The output circuits of the thyratron tubes include relays 96, 97 and 98 which include contacts for individually connecting the modulating signal from the channels A, B and C to amplifier 99 and loudspeaker 100.

To prevent the connection of the modulating signal from more than one channel to the amplifier 99 and loud-speaker, the relays 96, 97 and 98 have additional contacts for interlocking the output circuits of the thyratron tubes. This interlocking circuit prevents an additional thyratron from conducting to operate its relay when any one of the thyratrons is conducting. Considering the plate circuit of the thyratron 56, it will be noted that this circuit extends through the contacts 101 of relay 97 and contacts 102 of relay 98 to the $AC_2$ source. Therefore, if either of the thyratrons 94 or 95 is conducting to operate its relay (97 and 98), the thyratron 56 could not be connected to the $AC_2$ source to thereby operate its relay 96. Similarly, the thyratron tubes 94 and 95 are interlocked with each other and with the tube 56.

It is therefore seen that the signals from channels A, B and C are individually filtered to separate the modulating signals and the control signals, and the control signals are then processed to provide control voltages which are a measure of a characteristic of the carrier waves received at the receiving stations. A bias voltage is derived which is a measure of the combined control voltages and circuits are selectively rendered conducting by the individual control voltages when such voltages have a predetermined relation with the bias voltage produced from the combined voltage. When a conducting circuit is provided by the control voltage of one channel, the modulating signal from that channel is applied to the amplifier and reproducing means at the central station. The interlocking arrangement prevents connection of the signals from the other channel when one channel is connected. However, when the control voltage from the connected channel falls below a predetermined relationship with respect to all the control voltages, the modulating signal from the said channel will be disconnected and the signal from another channel will be connected to the amplifier and reproducing equipment. By proper adjustment of the circuit providing the bias voltages from the combined control voltages, the bias can be adjusted so that one of the control voltages which contributes to make the total will always be of sufficient amplitude to provide a conducting circuit. It may be that more than one control voltage will be of such an amplitude but it will be apparent that in such case only the voltage which first exceeded the predetermined value will cause the associated thyratron to be conducting and this will disable the other thyratron through the interlocking output circuits thereof.

Figure 6:
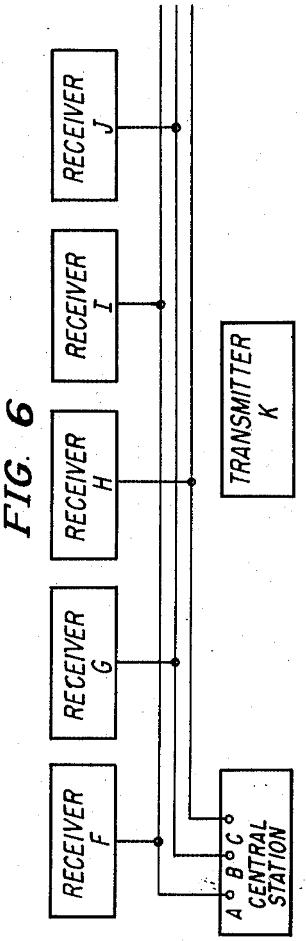
Fig. 6 illustrates in block diagram a second embodiment of the invention.

Considering now the system shown in Fig. 6, in this system a plurality of receivers are provided along a course such as for example along a microwave relay system having a plurality of stations F to J. In such a system it may not be practical to provide a separate communication channel from each receiver to the central station and it is therefore desired to connect a plurality of receivers to the same channel. In Fig. 6 the receivers at F and I are connected to channel A, the receivers at G and J are connected to channel B, and the receiver at H is connected to channel C. The illustration of Fig. 6 is purely schematic and more receivers may be provided along the course and interconnected to the three channels shown (or more or less channels). To provide communication between a transmitter K which may be on a vehicle moving along the relay system and the stations of the system, the signal from the transmitter may be picked up by the various receivers as the vehicle moves along the course. In the manner fully set forth above, these signals will be transmitted from the receivers together with control signals over the communication channel to the central station.

In a system as illustrated in Fig. 6, it may be that any one of the channels, such as the channel A to which receivers F and I are connected, may include two modulating signals and two control signals from the two receivers. In such case the signal from one of the receivers may be strong and that from the other may be weak. The weak signal would interfere with the strong signal so that the signal over this channel would not be a signal suitable for reproduction. In this case a single signal from one of the other channels, although not as strong as the strongest signal of the first channel, would be a better signal for reproduction. Because of the frequency response of the selecting filters at the control station, the desired signal is reproduced. Assuming for purposes of illustration that the signal from receiver F produces a weak signal and the receiver I produces a strong signal and that receiver G produces a signal of intermediate strength, the control signal then from the receiver F might have a frequency of 3700 cycles, the control signal from receiver I might have a frequency of 3900 cycles and the control signal from receiver G might have a frequency of 3800 cycles. The control signals from receivers F and I are on the same channel and therefore would be applied to the same filter simultaneously. However, since the response of the filter at 3700 cycles is greater than at 3900 cycles, the amplitude of the 3700 cycle signal would be much greater at the output of the filter. This signal is then applied to the amplifier and limiter which will in effect, eliminate the weaker 3900 cycle control signal. Therefore, the voltage output of the discriminator would be that produced from the 3700 cycle control signal which would be a relatively small control voltage. The 3800 cycle signal from receiver G would be applied through the separate channel B and if there is no other signal in the range passed by the filter to interfere therewith would pass through the limiter to the discriminator to produce a control voltage corresponding to this frequency. This would be a greater control voltage than the voltage produced from the 3700 cycle signal so that the selective system would select the signal on channel B instead of channel A even though a signal on channel A is stronger than that on channel B. This is a desirable result since the signal on channel B would provide better reproduction than the combined signals on channel A.

It is therefore seen that the system in accordance with the invention is subject to various diversified applications. It may be used for receivers which are separated by relatively small distances so that the receivers are positioned at locations having optimum signals under various conditions. The system will therefore select the receiver providing the best signal and automatically cause reproduction of this signal. In systems in which signals are to be received from moving objects, receivers can be located along the course of the objects so that strong signals will be received by at least one of the receivers at all times. To provide a large number of various receiver stations and connect the same to a central station over a relatively small number of channels, the system provides selection of not only the strongest signal but of the strongest signal having no interfering signal which would provide a signal satisfactory for reproduction.

The selecting circuit provided has the advantage that it is not continuously being switched to pick the strongest signal but remains connected to a particular channel as long as the signal from this channel is satisfactory for reproduction. It is only when the signal on the channel connected falls below a predetermined value, which would not provide good reproduction, that the system is switched to a different channel. As previously stated, the characteristic which controls the selection of the channel can be selected to provide the best characteristic in any application. In the system shown, a measure is taken of the signal substantially as received without any limiting action and further measures are taken after limiting action and after detection to determine noise limiting action.

Although certain embodiments of the invention are disclosed which are illustrative thereof, it is obvious that various other arrangements can be provided within the intended scope of the invention as defined in the appended claims.

I claim:

1. A signal receiving system including a plurality of physically separated receiving stations and a central station, receiving means at each of said stations for receiving modulated carrier waves and for deriving modulating signals of a predetermined band of frequencies therefrom, means at each station for producing a control signal having a frequency which varies with the strength of said received carrier wave, said control signal varying in a frequency range outside said band of frequencies of said modulating signals, with the control signals produced by the various stations in response to received carrier waves of a given strength having substantially the same frequency, a single communication channel connecting each receiving station with said central station, means for applying said modulating signals and said control signals from said receiving stations to said central station through the communication channels, means at said central station for separating the control signals from the modulating signals, and means responsive to the frequency of said control signals for selecting said modulating signal from the station which receives a strong carrier wave.

2. A signal receiving system including a plurality of physically separated receiving stations and a central station, receiving means at each of said stations for receiving modulated carrier waves and for deriving modulating signals of a predetermined band of frequencies therefrom, means at each station for producing a control signal having a frequency which varies with a characteristic of said received carrier wave and which is always of a frequency outside said band of frequencies, with the control signals produced by the various stations in response to received carrier waves having a predetermined characteristic having substantially the same frequency, means for combining said modulating signals and said control signals at each receiving station and for transmitting the same over a single communication channel to said central station, means at said central station for separating said modulating and control signals and for deriving control voltages which vary with the frequency of said control signals from said receiving stations, means for comparing the control voltages, and means responsive to said comparing means for selecting said modulating signal from a receiving station the control signal of which produces a control voltage having a predetermined relation with respect to the control voltages produced from the control signals of all of said receiving stations and eliminating the other modulating signals.

3. A signal receiving system including a plurality of physically separated receiving stations and a central station, each of said receiving stations including means for receiving a modulated carrier wave and for deriving the modulating signals therefrom, and means for producing a control signal having a frequency varying in accordance with the strength of the received carrier wave, with said control signals varying in a frequency range outside the frequency band of said modulating signals, a plurality of communications channels each of which connects a plurality of receiving stations to said central station for applying said modulating signals and said control signals thereto, individual means at said central station for separating said control signals and said modulating signals, said separating means attenuating the control signal of a frequency representing a strong carrier signal with respect to a control signal of a frequency representing a weaker carrier signal on a given channel to render the control signal of the weak carrier of greater amplitude than that of the strong carrier, means for limiting said control signals and for deriving a voltage varying in amplitude with the frequency of the control signal having the greatest amplitude on a channel, and means responsive to the voltages derived from the control signals having the various channels for selecting the modulating signal from one of said channels.

4. A signal receiving system including a plurality of physically separated receiving stations and a central station, each of said receiving stations including means for receiving a modulated carrier wave and for deriving the modulating signals therefrom, and means for producing a control signal having a frequency varying in accordance with the strength of the received carrier wave, with said control signals varying in a frequency band outside the frequency band of said modulating signals, a plurality of communications channels each of which connects a group of receiving stations to said central station for applying said modulating signals and said control signals thereto, individual means at said central station for receiving said signals from each of said communications channels and for separating said control signals from said modulating signals, said separating means selecting said control signals on a given channel so that a signal having a frequency representing a strong carrier wave is attenuated with respect to the signal of a frequency representing a weaker carrier wave, thereby rendering the signal representing the weak carrier of greater amplitude means for limiting the amplitude of said control signals from each channel to effectively eliminate all but the signal of greatest amplitude, means for deriving a control voltage varying with the frequency of said control signal of greatest amplitude from each channel, and means responsive to the voltages derived from the control signals from the various channels for selecting the modulating signal from said channel which produces a control voltage having a predetermined relation to the control voltages of all said channels.

5. A signal receiving system including a plurality of physically separated receiving stations and a central station, each of said receiving stations including means for receiving a modulated carrier wave and for deriving the modulating signals therefrom, and means for producing a control signal having a frequency varying in accordance with a characteristic of the received carrier wave, with said control signals varying in a frequency band outside the frequency band of said modulating signals, means at each receiving station for combining said modulating signals and said control signal, a plurality of communications channels each of which connects a group of receiving stations to said central station for applying said combined modulating and control signals from the receivers of each group thereto, individual means at said central station for receiving said signals from each of said communications channels and for separating said control signals and said modulating signals, selecting means for said control signals from each channel for attenuating the control signal of a frequency representing a carrier wave having a particular characteristic with respect to the signal of a frequency representing a carrier wave having a different characteristic, means for limiting the amplitude of said control signals from each channel to effectively eliminate all but the signal of greatest amplitude, means for deriving control voltages varying with the frequency of said control signals having greatest amplitude of each channel, and means responsive to said control voltages for selecting the modulating signals from said channel which produces a control voltage having a predetermined relation to the control voltages of all said channels.

6. A signal receiving system including a plurality of physically separated receiving stations and a central station, receiving means at each of said stations for receiving modulated carrier waves and for deriving modulating signals within a predetermined band of frequencies therefrom, oscillator means at each station for producing a control signal having a frequency outside said band of frequencies, circuit means for deriving a voltage from said receiving means varying in accordance with a characteristic of the received carrier wave, modulator means controlled by said voltage for modulating said oscillator so that the frequency of said control signal varies with said characteristic of said received wave, mixing means at each receiving station for combining said modulating signal and said control signal and for transmitting the same on a single communication channel to said central station, filter means at said central station for separating said modulating signal and said control signal from each communication channel, discriminator means for deriving individual control voltages which vary with the frequency of said control signals, and control means for providing a voltage varying with the total of all said control voltages and for selectively reproducing the modulating signal when the associated control voltage exceeds a predetermined relation with respect to said total voltage.

7. A signal receiving system including a plurality of physically separated receiving stations and a central station, receiving means at each of said stations for receiving modulated carrier waves and for deriving modulating signals within a predetermined band of frequencies therefrom, said receiving means including an intermediate frequency amplifier, a limiter and a detector, oscillator means at each station for producing a control signal having a frequency outside said band of frequencies, circuit means coupled to said intermediate frequency amplifier, said limiter and said detector for deriving a voltage varying in accordance with the signal level in said intermediate frequency amplifier and in said limiter and inversely with the noise produced by said detector, modulator means controlled by said voltage for modulating said oscillator so that the frequency of said control signal varies with said voltage, mixing means at each receiving station for combining said modulating signal and said control signal and for transmitting the same on a single communication channel to said central station, filter means at said central station for seperating said modulating signal and said control signal from each communication channel, discriminator means for deriving individual control voltages which vary with the frequency of said control signals, and control means for providing a voltage varying with the total of all said control voltages, and means for selectively reproducing the modulating signal when the associated control voltage exceeds a predetermined relation with respect to said total voltage.

8. A signal receiving system including a plurality of physically separated receiving stations and a central station, receiving means at each of said stations for receiving modulated carrier waves and for deriving modulating signals therefrom, filter means for limiting the frequency of said modulating signals to a predetermined band of frequencies, said receiving means including a squelch circuit for producing a voltage varying inversely with the noise produced at the receiver output, oscillator means at each station for producing a control signal having a frequency outside said band of frequencies, modulator means controlled by said voltage for modulating said oscillator so that the frequency of said control signal varies with said voltage in said squelch circuit, mixing means at each receiving station for combining said modulating signal and said control signal and for transmitting the same on a single communication channel to said central station, filter means at said central station for separating said modulating signal and said control signal from each communication channel, discriminator means for deriving individual control voltages which vary with the frequency of said control signals, and control means for providing a voltage varying with the total of all said control voltages, and means for selectively reproducing the modulating signal when the associated control voltage exceeds a predetermined relation with respect to said total voltage.

9. A signal receiving system including a plurality of physically separated receiving stations and a central station, receiving means at each of said stations for receiving modulated carrier waves and for deriving modulating signals within a predetermined band of frequencies therefrom, oscillator means at each station for producing a control signal having a frequency outside said band of frequencies, circuit means for deriving a voltage from said receiving means varying directly with a desired characteristic of the received carrier wave, modulator means controlled by said voltage for modulating said oscillator so that the frequency of said control signal varies with said characteristic of said received wave, mixing means at each receiving station for combining said modulating signal and said control signal, communicating channels connecting said receiving stations with said central station with each of said channels transmitting the combined modulating and control signal from a group of receivers, filter means at said central station for separating said modulating signals and said control signals on each channel and for selecting said control signals so that control signals of higher frequency are attenuated with respect to control signals of lower frequency on a given channel, limiter means coupled to said filter means for effectively eliminating all control signals from each channel except the control signal of greatest amplitude as passed by said filter means, discriminator means for deriving control voltages which vary with the frequency of said control signals from said limiter means and control means for selectively reproducing the modulating signal when the associated control voltage exceeds a predetermined relation with respect to said control voltage from all said channels.

10. A signal receiving system including a plurality of physically separated receiving stations and a central station, each of said receiving stations including means for receiving a modulated carrier wave and for deriving the modulating signals therefrom, and means for producing a control signal having a frequency varying directly with the strength of the received carrier wave, with said control signals varying in a frequency band outside, the frequency band of said modulating signals, a plurality of communications channels each of which connects a group of receiving stations to said central station for applying said modulating signals and said control signals thereto, individual filter means at said central station for separating said control signals and said modulating signals from each channel, with a control signal of a higher frequency being attenuated with respect to a control signal of lower frequency, means for limiting the amplitude of said control signal from each channel to pass only the signal of greatest amplitude, discriminator means for each channel for deriving control voltages varying with the frequency of said control signals passed by said limiting means, and control means including a first set of valves having input and output electrodes, means individually connecting said input electrodes of each of said valves to said discriminator means of a channel, a load connected to said output electrodes of said valves across which a voltage is produced varying with the sum of said control voltages, a second set of valves having input and output electrodes, input circuits coupled to said input electrodes of said valves of said second set, said input circuits including portions coupled to said load for providing a bias depending on said voltage thereacross and portions individually connected to said discriminator means for obtaining said control voltages therefrom so that the valves of said second set are rendered conducting when the control voltage applied thereto exceeds a predetermined portion of said voltage across said load, and output circuits individually coupled to said output electrodes of said valves of said second set including devices individually rendered operative when the valve to which it is connected is rendered conducting to select the modulating signal of the associated channel, said devices including interlocking means so that operation of one of said devices prevents operation of any other of said devices.

11. A signal receiving system including a plurality of physically separated receiving stations and a central station, receiving means at each of said stations for receiving modulated carrier waves and for deriving modulating signals of a predetermined band of frequencies therefrom, means at each station for producing a control signal having a frequency which varies with a characteristic of said received carrier wave and which is of a frequency outside said band of frequencies, a plurality of communication channels, each of which connects a plurality of said receiving stations with said central station for applying said modulating signals and said control signals thereto, reproducing means, and control means at said central station responsive to said control signals for selectively applying to said reproducing means the modulating signal from the station which receives a carrier wave having predetermined desired characteristics, said control means including individual control circuits responsive to the signals from each channel, said circuits including filter means for separating said control signals and said modulating signals with a control signal of higher frequency being attenuated with respect to a control signal of lower frequency, limiter means for effectively passing only the control signal of greatest amplitude, discriminator means for deriving a control voltage varying with the frequency of said control signal passed by said limiter means, first and second electron valves having input and output electrodes, circuit means connecting said input electrodes of said valves to said descriminator means for applying said control voltages thereto, and a control device connected to the output electrodes of said second valve and including means for connecting the modulating signal to said reproducing means when said second valve is rendered conducting, said control means including a circuit having a load portion connected to said output electrodes of said first valves and biasing portions connected to said input electrodes of said second valves for providing a bias thereto depending on said voltage across said load portion so that said second valves are selectively rendered conducting when the control voltage applied thereto exceeds a predetermined portion of said voltage across said load portion, said control devices including interlocking means so that operation of one of said devices prevents operation of any other of said devices.

12. A signal receiving system including a plurality of physically separated receiving stations and a central station, receiving means at each of said stations for receiving modulated carrier waves and for deriving modulating signals of a predetermined band of frequencies therefrom, means at each station for producing a control signal having a frequency which varies with a characteristic of said received carrier wave and which is of a frequency outside said band of frequencies, communication channels connecting said receiving stations with said central station for applying said modulating signals and said control signals thereto, reproducing means, and control means at said central station responsive to said control signals for selectively applying to said reproducing means the modulating signal from the station which receives a carrier wave having predetermined desired characteristics, said control means including individual control circuits for the signals from each channel which comprise, filter means for separating said control signal and said modulating signal, discriminator means for deriving a control voltage varying with the frequency of said control signal, first and second electron valves having input and output electrodes, circuit means connecting said input electrodes of said valves to said discriminator means for applying said control voltages thereto, and a control device connected to the output electrodes of said second valve and including means for connecting the modulating signal to said reproducing means when said second valve is rendered conducting, said control means including a circuit having a load portion connected to said output electrodes of said first valves and biasing portions connected to said input electrodes of said second valves for providing a bias thereto depending on said voltage across said load portion so that said second valves are rendered conducting when the control voltage applied thereto exceeds a predetermined portion of said voltage across said load, said control devices including interlocking means so that operation of one of said devices prevents operation of any other of said devices.

13. A signal receiving system including a central station, a plurality of physically separated receiving stations, receiving means at each of said receiving stations for receiving modulated carrier waves and for deriving modulating signals therefrom, means associated with each of said receiving means for producing a control signal representing a characteristic of the modulated carrier wave at that receiving means, means for connecting said receiving stations to said central station for applying the modulating signals and the control signals thereto, means at said central station for reproducing modulated signals, switching means at said central station individual to each of said receiving means for selectively connecting that receiving means to said reproducing means, and means for comparing the control signals from each receiving station with the control signals from all said receiving stations to selectively actuate only one switching means and connect only the receiving means individual thereto to said reproducing means and to prevent passage of the signals from the other receiving means to said reproducing means.

References Cited in the file of this patent

UNITED STATES PATENTS

| | | |
|---|---|---|
| 1,763,194 | Sivian | June 10, 1930 |
| 1,922,059 | Ohl | Aug. 15, 1933 |
| 2,282,526 | Moore | May 12, 1942 |
| 2,375,051 | Taylor | May 1, 1945 |
| 2,507,160 | Hugenholz et al. | May 9, 1950 |
| 2,513,803 | Kahn | July 4, 1950 |
| 2,579,223 | Baker | Dec. 18, 1951 |
| 2,636,115 | Peterson | Apr. 21, 1953 |
| 2,648,765 | Young | Aug. 11, 1953 |